US012316005B2

(12) United States Patent
Simon et al.

(10) Patent No.: US 12,316,005 B2
(45) Date of Patent: May 27, 2025

(54) ACTIVE ANTENNA ESPECIALLY FOR THE SPACE-TECHNOLOGY FIELD

(71) Applicants: AIRBUS DEFENCE AND SPACE SAS, Toulouse (FR); TESAT-SPACECOM GmbH & Co. KG, Backnang (DE)

(72) Inventors: Coraline Simon, Toulouse (FR); Martin Kirsch, Backnang (DE); Klaus Schieber, Backnang (DE)

(73) Assignees: AIRBUS DEFENCE AND SPACE SAS, Toulouse (FR); TESAT-SPACECOM GmbH & Co. KG, Backnang (DE)

( * ) Notice: Subject to any disclaimer, the term of this patent is extended or adjusted under 35 U.S.C. 154(b) by 0 days.

(21) Appl. No.: 18/720,339

(22) PCT Filed: Dec. 14, 2022

(86) PCT No.: PCT/EP2022/085823
§ 371 (c)(1),
(2) Date: Aug. 27, 2024

(87) PCT Pub. No.: WO2023/111001
PCT Pub. Date: Jun. 22, 2023

(65) Prior Publication Data

US 2025/0070477 A1 Feb. 27, 2025

(30) Foreign Application Priority Data

Dec. 15, 2021 (FR) ...................................... 2113575

(51) Int. Cl.
*H01Q 1/02* (2006.01)
*H01Q 3/12* (2006.01)
(Continued)

(52) U.S. Cl.
CPC ............. *H01Q 21/061* (2013.01); *H01Q 1/02* (2013.01); *H01Q 3/12* (2013.01)

(58) Field of Classification Search
CPC .. H01Q 1/00; H01Q 1/02; H01Q 1/38; H01Q 3/12; H01Q 21/00; H01Q 21/06; H01Q 21/061
See application file for complete search history.

(56) References Cited

U.S. PATENT DOCUMENTS 6,005,531 A * 12/1999 Cassen ............... H01Q 21/0025 343/754
7,348,932 B1 * 3/2008 Puzella .............. H01Q 21/0025 342/373
(Continued)

FOREIGN PATENT DOCUMENTS

EP 2 654 121 A1 10/2013
FR 2751473 A1 1/1998
FR 2881885 A1 8/2006

OTHER PUBLICATIONS

International Search Report with English Translation for PCT/EP2022/085823, mailed Mar. 31, 2023, 6 pages.
(Continued)

*Primary Examiner* — Tho G Phan
(74) *Attorney, Agent, or Firm* — Nixon & Vanderhye P.C.

(57) ABSTRACT

An active antenna is disclosed including a passive portion of an antenna array extended at one end by a plate in which apertures are formed, at least one active assembly for transmitting radiofrequency RF waves, called assembly, through said apertures, each assembly including a first row of active modules facing apertures of the plate, a second row of active modules facing apertures of the plate and attached to the first row of active modules, a beam attached to the plate and held clamped between the first and second rows of active modules, a heat-transfer duct in contact with the first
(Continued)

and second rows of active modules and jutting out on either side of said first and second rows of active modules.

8 Claims, 6 Drawing Sheets

(51) Int. Cl.

| | |
|---|---|
| ***H01Q 21/00*** | (2006.01) |
| ***H01Q 21/06*** | (2006.01) |

(56) References Cited

U.S. PATENT DOCUMENTS

| | | | | |
|---|---|---|---|---|
| 8,228,238 | B2 * | 7/2012 | Thiam | H01Q 5/371<br>343/700 MS |
| 8,803,759 | B1 | 8/2014 | Angelucci | |
| 8,941,540 | B2 * | 1/2015 | Harper | H01Q 21/062<br>343/700 MS |
| 10,320,051 | B2 * | 6/2019 | Chiu | H05K 7/20336 |
| 10,367,255 | B1 * | 7/2019 | Booen | H01Q 19/104 |
| 10,931,028 | B2 * | 2/2021 | Vouzelaud | H01Q 21/0025 |
| 2013/0183913 | A1 | 7/2013 | Tevell et al. | |

OTHER PUBLICATIONS

Written Opinion of the ISA for PCT/EP2022/085823, mailed Mar. 31, 2023, 7 pages.

* cited by examiner

ACTIVE ANTENNA ESPECIALLY FOR THE SPACE-TECHNOLOGY FIELD

CROSS REFERENCE TO RELATED APPLICATIONS

The present application is a National Phase of International Application Number PCT/EP2022/085823 filed Dec. 14, 2022, which designated the U.S. and claims priority benefits from French Application Number FR 2113575 filed Dec. 15, 2021, the entire contents of each of which are hereby incorporated by reference.

TECHNICAL FIELD OF THE INVENTION

The invention relates to the field of active antennas. More particularly, yet not exclusively, it applies to radars and to communication systems.

Preferably, the invention is intended for application in the space-technology field.

PRIOR ART

Current active antennas are designed in order to meet several requirements, in particular in terms of compactness and power.

An active antenna consists of radiating elements connected to active modules for transmitting and/or receiving radiofrequency waves. In particular, the need for compactness is related to the radiofrequency specifications which dictate the spacing between two radiating emission apertures. Thus, for a LEO (English acronym standing for "Low Earth Orbit") satellite, the need for compactness is generally greater than for a geostationary satellite so-called GEO (English acronym standing for "Geostationary Earth Orbit") satellite.

An existing solution consists in arranging the radiating elements on a shaped, non-planar surface. An example is described in the patent application EP 2 654 121 where the shaped surface is a frustoconical surface and the radiating elements are placed on several generator lines.

In addition, in view of the thermal power dissipated by each of the active modules for transmitting and/or receiving radiofrequency waves, the active antenna should necessarily comprise a thermal control system, capable of maintaining the active modules at an appropriate temperature.

The documents FR 2 881 885 and FR 2 751 473 describe examples of active antennas comprising rows of active modules arranged between beams, the beams being crossed by a cooling system enabling cooling of the active modules.

DISCLOSURE OF THE INVENTION

The present invention aims to overcome the aforementioned drawbacks.

To this end, an active antenna is provided by the present invention, comprising:

- a passive portion of an antenna array extended at one end by a plate in which apertures are formed,
- at least one active assembly for transmitting radiofrequency RF waves, called assembly, through said apertures, each assembly comprising:
  - a first row of active modules facing apertures of the plate,
  - a second row of active modules facing apertures of the plate and attached to the first row of active modules,

- a beam attached to the plate and held clamped between the first row of active modules and the second row of active modules,
  - a heat-transfer duct in contact with the first row of active modules and the second row of active modules and jutting out on either side of said first and second rows of active modules.

The beam of an assembly has a bevelled profile cooperating with profiles of the first and second rows of active modules of said assembly to press them against the plate.

By "bevelled profile", it should be understood that the beam has, in cross section, a frustoconical shape, with its small base on the plate side.

The first row of active modules is fixedly assembled to the beam.

Each active module comprises at least one solid-state power amplifier, preferably a plurality of solid-state power amplifiers.

In particular embodiments, the invention further meets the following features, implemented separately or according to any of their technically-feasible combinations.

In particular embodiments of the invention, the antenna comprises a plurality of assemblies arranged against one another, wherein the second row of active modules of one assembly is attached to the first row of active modules of an adjoining assembly.

In particular embodiments of the invention, intermediate bars are arranged between second rows of active modules of one of the assemblies and first rows of active modules of an adjoining assembly.

In particular embodiments of the invention, the number of active modules per row of one assembly is increasing from one edge of the plate up to a centre of the plate and then decreasing from said centre of the plate towards an opposite edge. Thus, such an arrangement of active modules has an overall pattern close to a circular, and preferably symmetrical, shape which advantageously allows obtaining an improved radiofrequency performance.

In particular embodiments of the invention, to guarantee the proper positioning of the active modules of each row of an assembly during placement thereof on the plate, each of said active modules comprises alignment members capable of cooperating with complementary alignment members arranged on the plate.

In particular embodiments of the invention, to guarantee the proper positioning of the beam of an assembly during placement thereof on the plate, said beam comprises alignment elements capable of cooperating with complementary alignment elements arranged on the plate.

Advantageously, an active antenna according to the invention is compact and allows, thanks to the apertures close to one another on the plate, a dense assembly of active modules, and therefore of SSPA amplifiers.

Such an active antenna is capable of withstanding great vibration loads.

It also suggests the set-up of a heat pipe in contact with each of the modules enabling an effective thermal regulation of the active modules despite their compactness.

The invention also relates to a method for mounting an active antenna in accordance with at least one of its embodiments, comprising a step of assembling an assembly, so-called first assembly, on the plate. Said step comprises:

- assembling the beam of the first assembly to the plate,
- assembling the first row of active modules of the first assembly to said beam,
- assembling the heat-transfer duct of the first assembly to said first row of active modules, assembling the second row of active modules of the first assembly to said first row of active modules.

The previous four steps are carried out consecutively, one after another.

In particular implementations, the invention further meets the following features, implemented separately or according to any of their technically-feasible combinations. In particular embodiments of the invention, the method comprises setting at a determined pressure of each active module against the plate, then relieving after assembly of each active module to the beam or to an opposite active module.

In particular embodiments of the invention, the mounting method comprises a step of assembling another assembly, so-called second assembly, adjoining the first assembly, said step comprising:

- assembling the beam of the second assembly to the plate,
- assembling the first row of active modules of the second assembly to said beam and to the second row of active modules of the first assembly,
- assembling the heat-transfer duct of the second assembly to said first row of active modules of the second assembly,
- assembling the second row of active modules of the second assembly to the first row of active modules of the second assembly.

The previous four steps are carried out consecutively, one after another.

In particular embodiments of the invention, the mounting method comprises tilting the first row of active modules of the second assembly upon insertion of said active modules between the second row of active modules of the first assembly already in place and the beam.

Such a mounting method enables a very dense assembly of active modules, despite a limited access to each active module.

In addition, assembling the assembly to the plate as suggested allows withstanding great vibration loads. Thus, an active antenna made in this manner may be suitable for application in the space-technology field. Such a method allows assembling the second assembly both to the beam and to the first assembly.

BRIEF DESCRIPTION OF THE FIGURES

The invention will be better understood upon reading the following description, given as a non-limiting example, and made with reference to the following figures.

In these figures, identical reference numerals from one figure to another refer to identical or similar elements. Moreover, for clarity, the drawings are not plotted to scale, unless stated otherwise.

DESCRIPTION OF THE EMBODIMENTS

Figure 1:
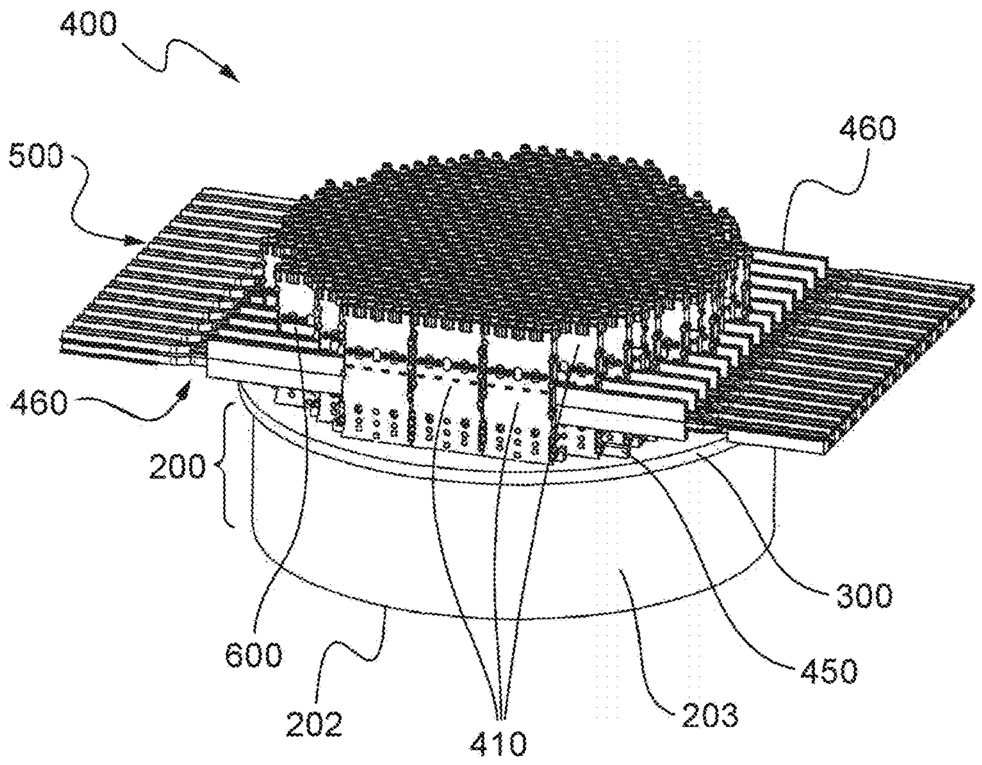
FIG. 1 illustrates a perspective view of an active antenna according to an embodiment of the invention.

The present invention relates to an active antenna.

The invention is described in the particular context of one of its preferred fields of application wherein the active antenna is intended to be embedded in a spacecraft, such as a satellite, and intended to transmit and/or receive radiofrequency signals (RF signals), such as radar signals.

However, the description hereinafter is in no way restrictive and the active antenna could have other applications or uses, without departing from the scope of the invention.

An active antenna 100 according to a preferred embodiment of the invention is illustrated in FIGS. 1 to 9.

The active antenna 100 comprises a passive portion 200, an active portion 400 and a plate 300 forming an interface between said passive portion and said active portion.

Passive Portion 200:

In particular, the passive portion 200 may conventionally comprise waveguides, polarisers and radiating apertures (not shown in the figures).

The passive portion 200 has one end, called first end 201, located on the side of the plate 300. The passive portion 200 comprises another end, called second end 202. In the example of the figures, the second end 202 is opposite to the first end 201.

The radiating apertures are arranged at the second end 202.

Figure 2:
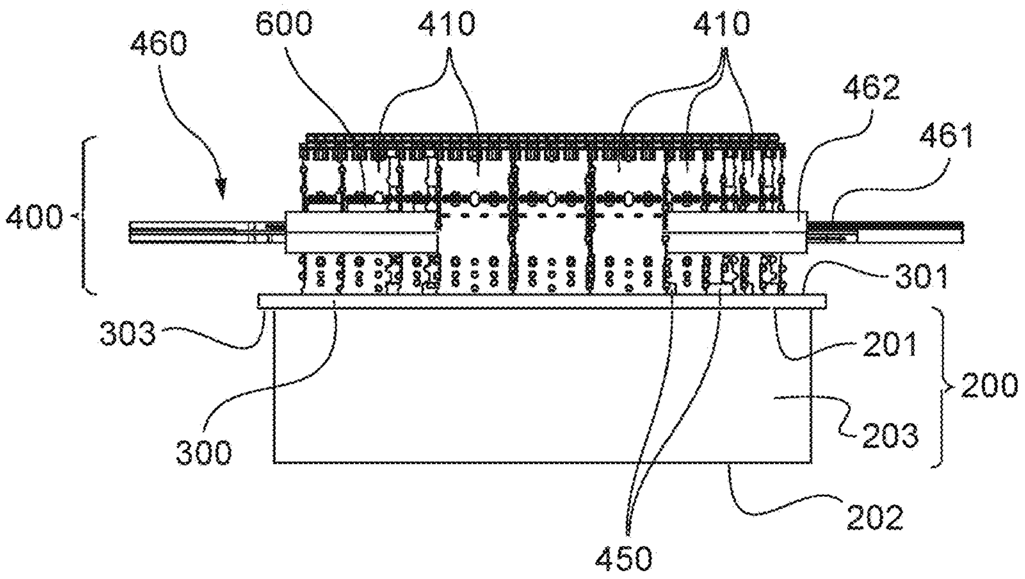
FIG. 2 illustrates another side view of the active antenna of FIG. 1.
Figure 3:
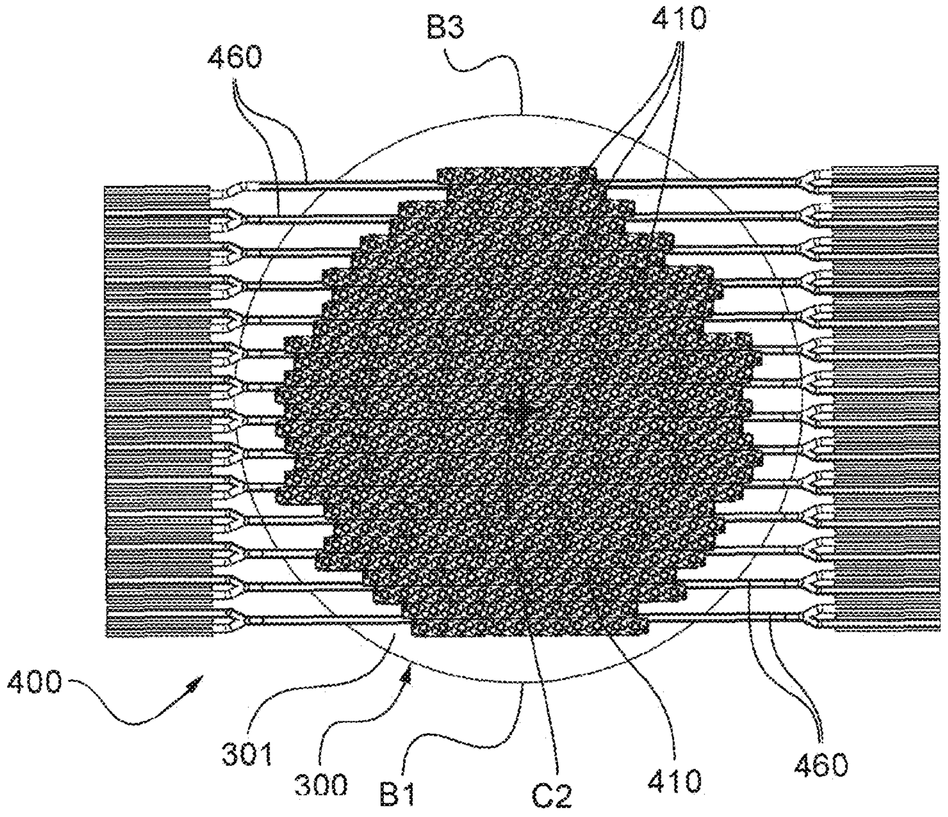
FIG. 3 illustrates another top view of the active antenna of FIG. 1.

As illustrated in FIGS. 1 to 3, the passive portion 200 comprises a body 203.

By extension, the first end 201 of the passive portion 200 corresponds to a first end of the body 203 and the second end 202 of the passive portion 200 corresponds to a second end of the body 203.

Plate 300:

The passive portion 200 is extended by the plate on which the active portion 400 is arranged, as illustrated in FIGS. 1 to 3. For example, the plate 300 is fastened to the passive portion 200.

Thus, the plate 300 has a face 301 intended to be opposite the active portion 400.

In the non-limiting example of FIGS. 1 to 3, the plate 300 has a circular shape.

Preferably, the plate 300 has a diameter larger than the largest diameter of the body 203. Thus, the plate 300 has a jutting out peripheral portion 303, forming a collar thereby forming a flange on which a panel (not shown in the figures) of the spacecraft could bear and be fastened thereto.

The plate 300 and the body 203 can be made integrally in one-piece.

Figure 4:
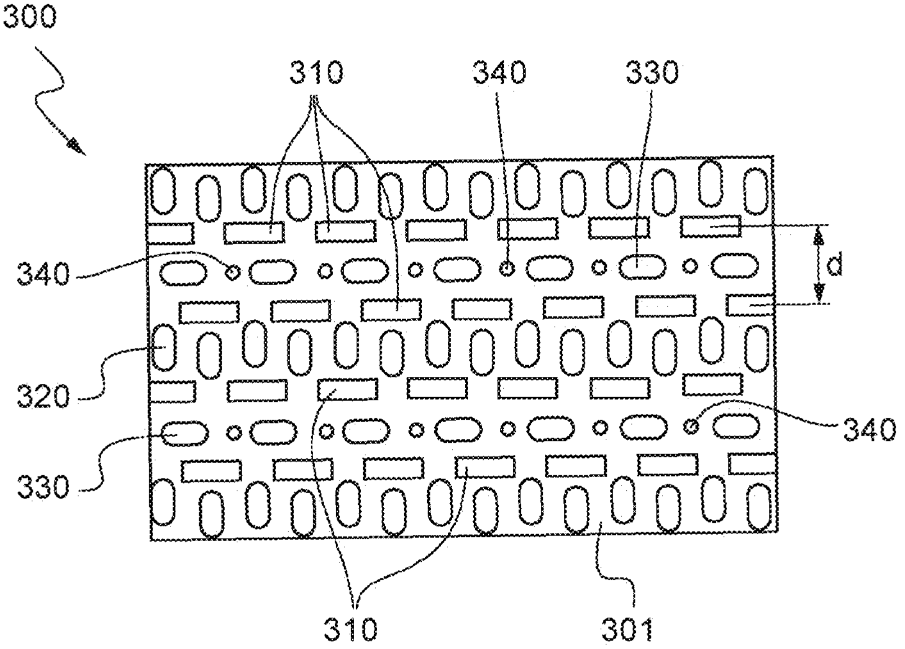
FIG. 4 illustrates an embodiment of a plate belonging to an active portion of the active antenna.

Advantageously, the plate 300 comprises apertures 310, as illustrated in FIG. 4.

Said apertures pass throughout at least the thickness of the plate 300 and opens out through the face 301.

Preferably, the apertures 310 are arranged into at least two parallel rows. Preferably, the apertures 310 are arranged into a plurality of parallel rows, with an even number of rows.

Preferably, the apertures 310 arranged on each row of apertures are equidistant. The distance between two apertures 310, for each of the rows of apertures, is preferably substantially identical.

Active Portion 400:

The active portion 400 comprises at least one active assembly for transmitting and/or receiving radiofrequency RF waves. In the remainder of the description, an active assembly for transmitting radiofrequency RF waves will be called assembly.

Preferably, the active portion 400 comprises a plurality of assemblies. Each assembly of the active portion 400 comprises the same constituent elements.

An example of an assembly is now described.

An assembly comprises:

Two rows, called first and second rows, of active modules 410,

A beam 450,

A heat-transfer duct 460.

An assembly does not comprise more than two rows of active modules 410.

An assembly necessarily comprises the same number of active modules 410 on the two rows. Each active module 410 of the second row is intended to be substantially opposite an active module 410 of the first row.

Advantageously, each row of active modules 410 of an assembly is intended to be opposite a row of apertures 310 of the plate 300.

One assembly may differ from another assembly by the number of active modules 410.

The beam 450 and the heat-transfer duct 460 are distinct elements.

Active Module:

Each active module 410 of an assembly comprises at least one solid-state power amplifier. In the remainder of the description, a solid-state power amplifier will be referred to as SSPA Amplifier (standing for "A Solid State Power Amplifier" in English).

Advantageously, each active module 410 comprises a plurality of SSPA amplifiers.

In a preferred embodiment, such as that one illustrated in the figures, each active module 410 comprises four SSPA amplifiers.

Each active module 410 is in the form of a case 420, inside which the amplifiers SSPA are arranged.

Preferably, the cases 420 of the active modules 410 have an identical shape.

Figure 5:
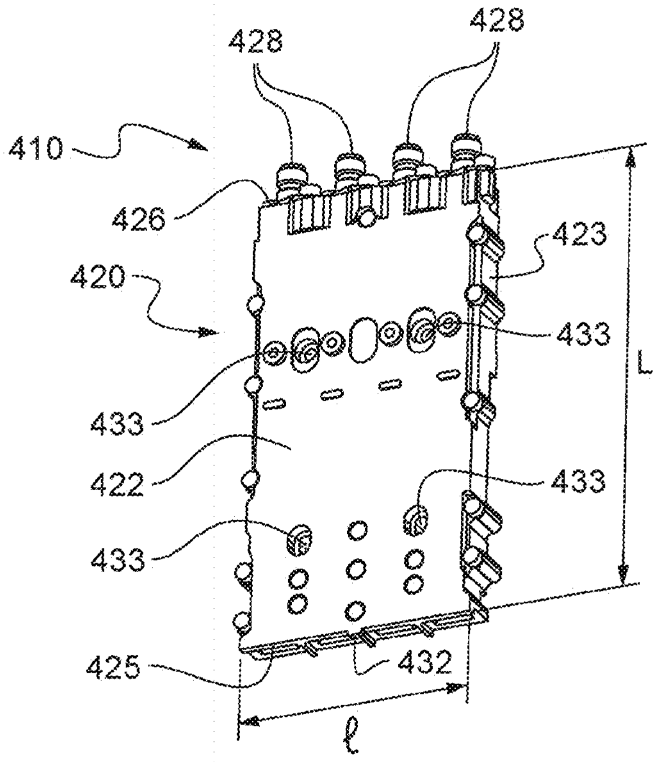
FIG. 5 illustrates an embodiment of an active module belonging to the active portion of the active antenna of FIG. 1.
Figure 6:
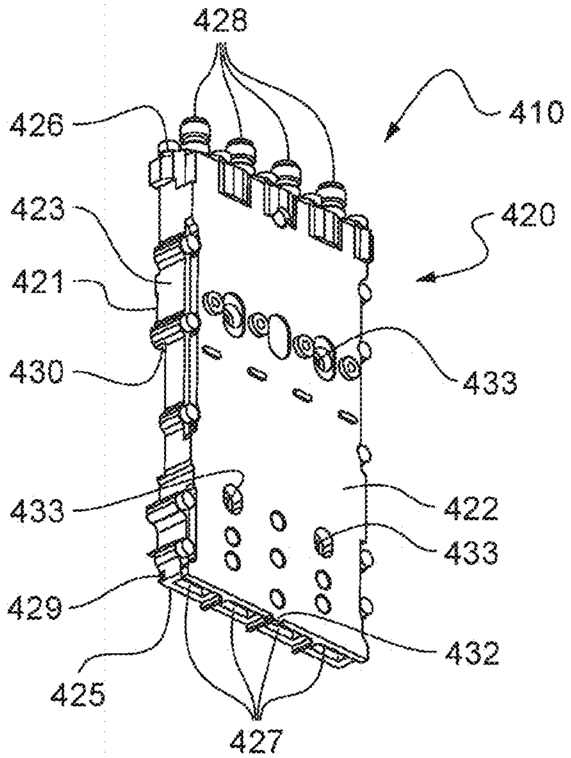
FIG. 6 illustrates another perspective of the active module of FIG. 5.

As illustrated in FIGS. 5 and 6, each case generally has a rectangular parallelepiped geometric shape. For example, each case 420 is formed of two shells assembled together.

Each case 420 comprises a first face 421 and a second face 422, opposite the first face 421, two longitudinal edges 423 and two lateral edges 425, 426.

Each case 420 has:

a length L, between the two lateral edges 425, 426, a width I, between the two longitudinal edges 423, a thickness e, between the first face 421 and the second face 422.

When they are placed on the plate 300, the active modules 410 of an assembly are positioned so that:

the first face 421 of the case 420 of an active module 410 of a first row is opposite the first face 421 of the case 420 of an active module 410 of the second row, a lateral edge of the case 420 of each active module 410, called first lateral edge 425, is opposite the face 301 of the plate 300, two neighbouring active modules 410 of the same row are adjoined at a longitudinal edge 423 of each case.

Advantageously, as detailed hereinafter, these cases are not fastened to the plate directly by screws inserted perpendicularly into the plate. Indeed, such an arrangement of the screws for fastening the modules would lead to a considerable limitation in terms of compactness. Thus, the cases are advantageously fastened, in the active antenna according to the invention, thanks to screws arranged parallel to the plane of the plate.

Thus, the active modules 410 are positioned perpendicularly with respect to the plate 300, assembled laterally to one another on each row.

Such an arrangement of the active modules 410 on the plate 300 allows reducing their bulk on said plate 300, allowing increasing the number of active modules 410 to be positioned on said plate 300.

Each active module 410 comprises at least one radiofrequency output interface 427, one RF output interface 427 by SSPA amplifier.

Thus, in a preferred embodiment, in the case where an active module 410 comprises four SSPA amplifiers, said active module 410 comprises four RF output interfaces 427, as illustrated in FIG. 6.

The RF output interfaces 427 are arranged at the first lateral edge 425 of the case, and are evenly distributed over said first lateral edge.

In one embodiment, the RF output interfaces 427 of the active module 410 are in the form of waveguides.

The RF output interfaces 427 of an active module 410 are arranged such that, when said active module 410 is in position on the plate 300, each output interface RF 427 is intended to come respectively opposite an aperture 310 of a row of apertures 310 of the plate 300.

Each active module 410 further comprises a seal arranged around each RF output interface 427. This seal will be pressed before the active module is permanently fastened to the plate, after which the mounting pressure is removed. For example, a press is used to apply a nominal determined pressure specific to the seal. Advantageously, the invention allows accurately setting the pressure applied to the seals, in the final installation.

Thus, in the non-limiting example of the invention where the active module 410 comprises four RF output interfaces 427, said active module 410 comprises four seals.

Each seal of an active module 410 is arranged around an RF output interface 427 such that, when the active module 410 is in position on the plate 300, said seal is arranged around an aperture 310 of a row of apertures 310 of the plate 300.

Each active module 410 comprises at least one radiofrequency input interface 428, one RF input interface per SSPA amplifier.

Thus, in a preferred embodiment, in the case where an active module 410 comprises four SSPA amplifiers, said active module 410 comprises four RF input interfaces 428, as illustrated in FIGS. 5 and 6.

The RF input interfaces 428 are arranged at a second lateral edge 426 of the case 420 and are evenly distributed over said second lateral edge.

In one embodiment, the RF input interfaces 428 are in the form of coaxial outputs. Preferably, in order to guarantee the proper positioning of the active modules 410 during placement thereof on the plate 300, the active modules 410 may comprise alignment members 432, as illustrated in FIG. 6, intended to cooperate with complementary alignment members 320 arranged on the plate 300, at the face 301, as illustrated in FIG. 4. Preferably, the alignment members 432 of an active module 410 are arranged at the first lateral edge 425 of the case 420 of said active module 410.

In one embodiment, the alignment members 432 of the active modules 410 are alignment pins and the complementary 320 alignment members 432 on the plate 300 are receiving pins. Conversely, and without departing from the scope of the invention, the alignment members 432 of the active modules 410 may be receiving pins and the complementary alignment members 320 on the plate 300 are alignment pins.

Preferably, each active module 410 of one assembly comprises first orifices 433 for receiving fastening elements, called first fastening elements 510. These first fastening elements 510 are intended to assemble two modules opposite one another of the same assembly. The first orifices 433 pass throughout the thickness of the case 420 of the active module 410.

Preferably, the first fastening elements 510 consist of reversible fastening elements, i.e. they can be installed and removed where necessary.

In a preferred embodiment, the first fastening elements 510 consist of clamping screws and the first orifices 433 of the active module 410 are threaded, forming nuts for the clamping screws.

In one embodiment, as illustrated in FIGS. 5 and 6, each active module 410 comprises four first orifices 433.

Preferably, each active module 410 of one assembly comprises second orifices 434 for receiving fastening elements, called second fastening elements 520. These second fastening elements 520 are intended to assemble an active module 410 to the beam 450 of said assembly, as will be described later on. The second orifices 434 pass throughout the thickness of the case 420 of the active module 410, and arranged on the side of the first lateral edge 425.

Preferably, the second fastening elements 520 consist of reversible fastening elements.

In a preferred embodiment, the second fastening elements 520 consist of clamping screws and the second orifices 434 of the active module 410 are threaded, forming nuts for the clamping screws.

In one embodiment, as illustrated in FIGS. 5 and 6, each active module 410 comprises two second orifices 434.

Beam 450:

Advantageously, the beam 450 of one assembly is a longitudinal beam 450, intended to be arranged between two rows of apertures 310 of said plate 300 and to be held clamped between the first row of active modules 410 and the second row of active modules 410.

Advantageously, the beam 450 is intended to:

be assembled to the plate 300, opposite the face 301 of said plate, be assembled to the first row of active modules 410, in order to hold the active modules 410 of the first row in position with respect to the plate 300 and to the passive portion 200.

Preferably, in order to guarantee proper positioning thereof on the plate 300, the beam 450 may comprise alignment elements (not shown in the figures) intended to cooperate with complementary alignment elements 330 arranged on the plate 300. The complementary alignment elements 330 arranged on the plate 300 are arranged between two rows of apertures 310 of said plate 300 intended to receive two rows of active modules 410 of one assembly, as illustrated in FIG. 4.

In one embodiment, the alignment elements of the beam 450 consist of alignment pins and the complementary alignment elements 330 on the plate 300 consist of receiving pins. Conversely, and without departing from the scope of the invention, the alignment elements of the beam 450 may consist of receiving pins and the complementary alignment elements 330 on the plate 300 consist of alignment pins.

Preferably, the beam 450 comprises first orifices 451 for receiving fastening elements, called third fastening elements 530. These third fastening elements 530 are intended to assemble the beam 450 to the plate 300. The first orifices 451 of the beam 450 are open-through.

In parallel, the plate 300 also comprises first orifices 340 for receiving the third fastening elements 530. The first orifices 340 of the plate 300 extend across the thickness of the plate 300, from the face 301 of said plate 300. Preferably, the first orifices 340 of the plate 300 do not extend throughout the thickness of the plate 300. The first orifices 340 of the plate 300 are arranged on the plate 300 such that, when the beam 450 is in position on the plate 300, said first orifices 340 of the plate 300 are opposite the first orifices of the beam 450.

Preferably, the third fastening elements 530 consist of reversible fastening elements. In a preferred embodiment, the third fastening elements 530 consist of clamping screws and the first orifices 451, 340 of the beam 450 and of the plate 300 are threaded, forming nuts for said clamping screws.

Preferably, the beam 450 comprises second orifices 452 for receiving the second fastening elements 520. As described before, the second fastening elements 520 are intended to assemble the beam 450 to an active module 410. The second orifices 452 of the beam 450 are open-through.

The second orifices 452 of the beam 450 are arranged in the beam 450 such that, when the beam 450 and an active module 410 of the first row are in position on the plate 300, said second orifices of the beam 450 are opposite the second orifices 434 of said active module.

In a preferred embodiment, the second fastening elements 520 consist of clamping screws and the second orifices 434 of the active module 410 and of the beam 450 are threaded, forming nuts for the clamping screws.

Figure 7:
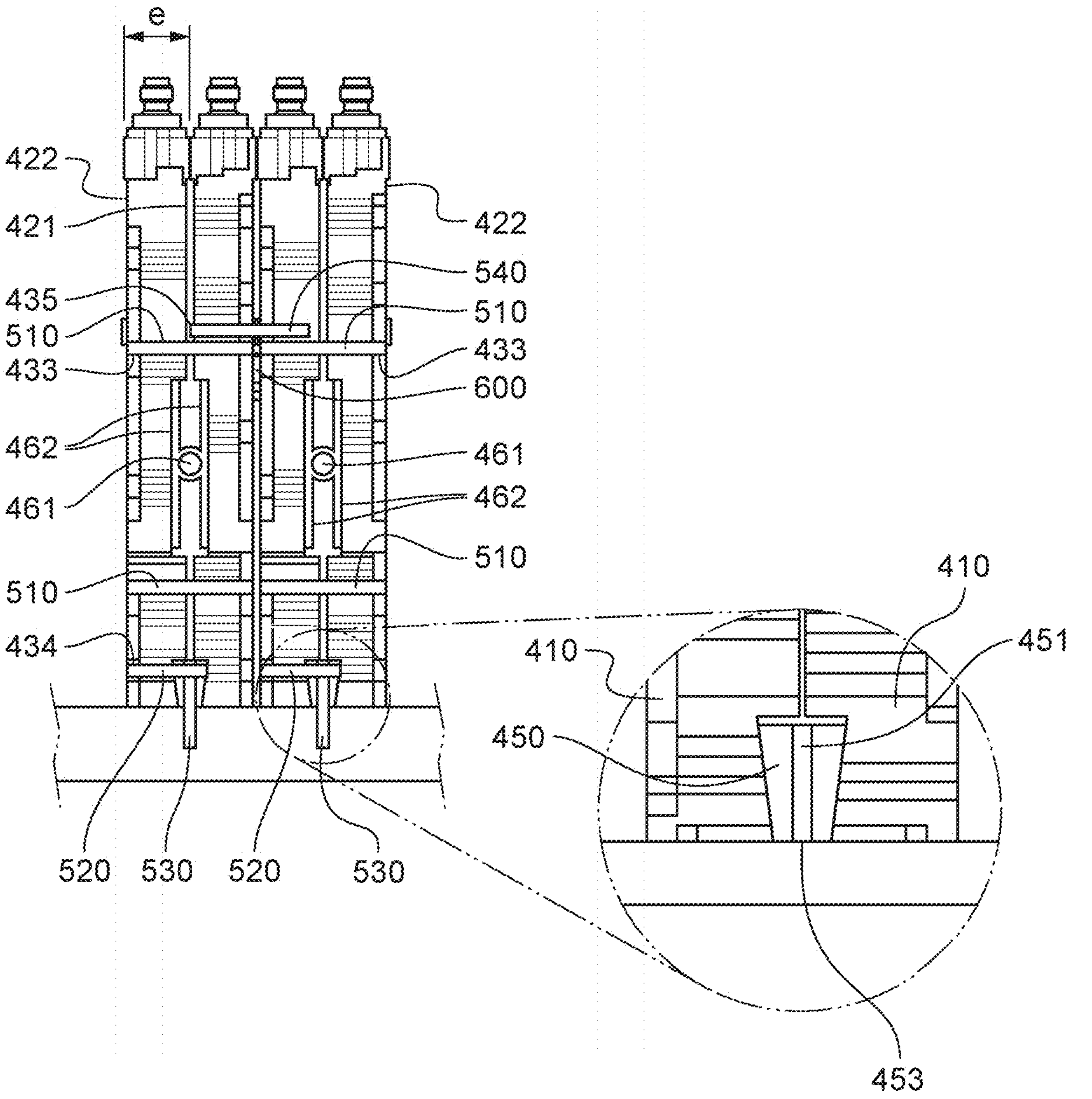
FIG. 7 illustrates a side view of an assembly of two active modules of an active assembly for transmitting radiofrequency RF waves of the active portion of the active antenna of FIG. 1.
Figure 8A:
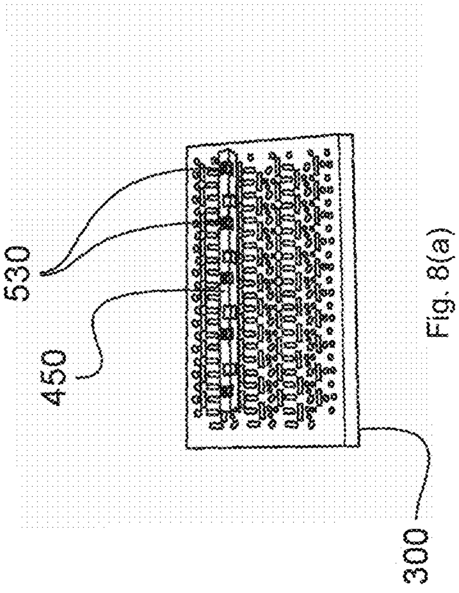
FIGS. 8 *a*), 8(*b*), 8(*c*), 8(*d*), and 8(*e*) illustrate the steps of assembling a first active assembly for transmitting radiofrequency RF waves on a plate of the active antenna.
Figure 8B:
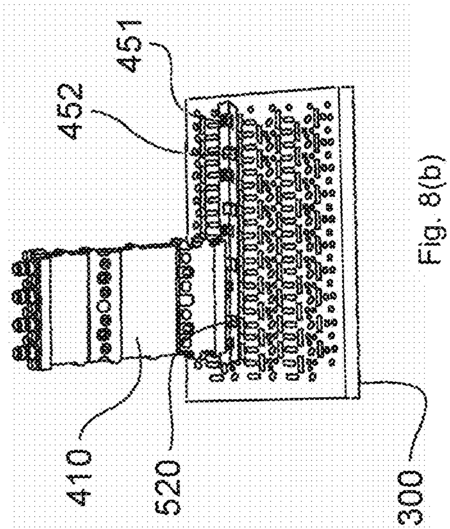
Figure 8C:
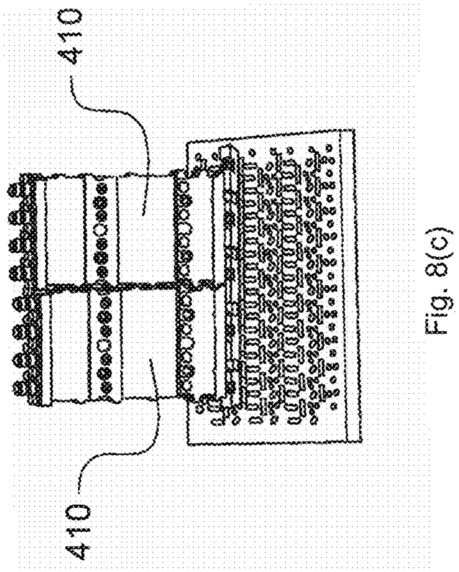
Figure 8D:
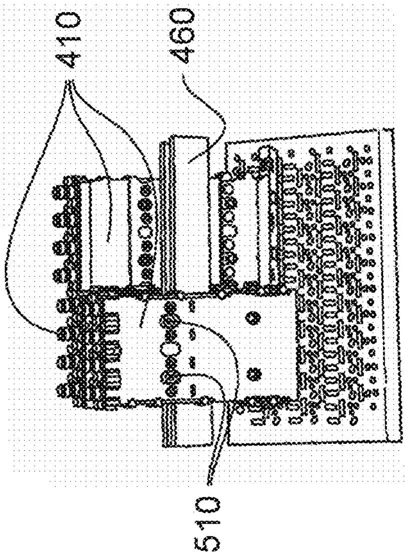
Figure 8E:
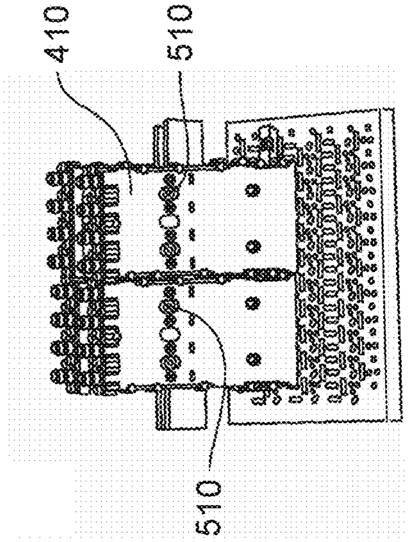
Figure 9A:
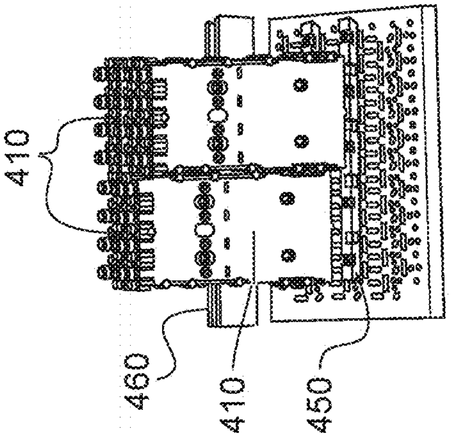
FIGS. 9(*a*), 9(*b*), 9(*c*), 9(*d*), and 9(*e*) illustrate the steps of assembling a second active assembly for transmitting radiofrequency RF waves, following the assembly of the first active assembly for transmitting radiofrequency RF waves.
Figure 9B:
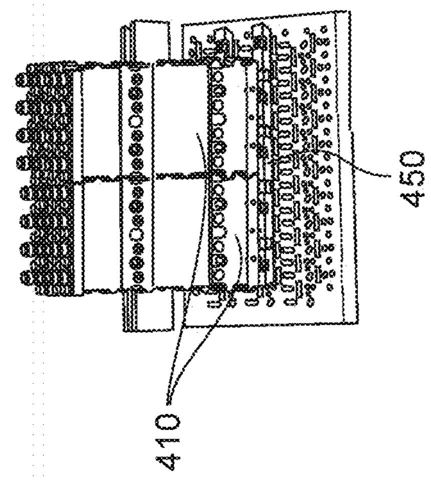
Figure 9C:
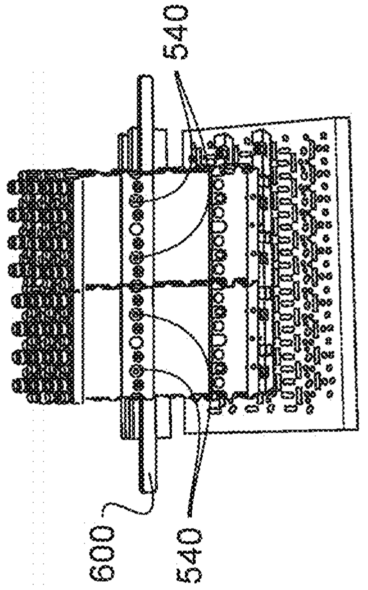
Figure 9D:
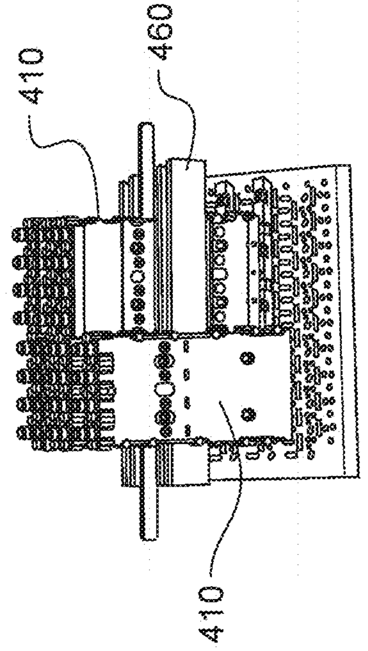
Figure 9E:
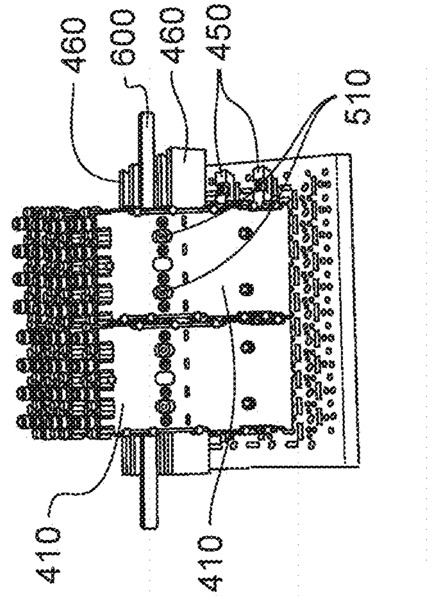

The beam 450 has a bevelled profile. More specifically, the beam 450 has a trapezoidal cross-section, as illustrated in FIG. 7. In particular, the trapezoidal section of the beam has a plane of symmetry passing through the middle of the trapezium.

One advantage of this trapezoidal profile beam is that, by clamping the active modules opposite one another, they are pressed against the plate 300, without requiring clamping by screwing directly into the plate. Thus, a sufficient clamping is achieved even without having access for screwing directly into the plate.

The beam 450 is intended to be positioned on the plate 300 such that its small base 453 is arranged opposite the plate 300. In other words, when the beam 450 is in position on the plate 300, the beam 450 is reduced progressively in the direction of the plate 300.

For example, the parts, such as the beams, are made of aluminium, which material has sufficient mechanical characteristics, while having a reduced mass. In a preferred embodiment, as illustrated in FIG. 7, each active module 410 may have, over its entire width, an indentation 429 for receiving a portion of the beam 450. Said indentation has a shape complementary to a portion of the cross-section of the beam 450, preferably of half of the cross-section of the beam 450. In the clamped position, a clearance is left between the beam and the active modules 410, on the face of the beam opposite the plate. Thus, there is a good contact at the inclined planes of the beam, which guarantees a good mechanical strength. Such an indentation 429 is formed in the case 420 of the active modules 410, at the first face 421, and extends from the first lateral edge 425. Thus, when two active modules 410 of one assembly are positioned opposite the plate 300, these substantially surround the beam 450. The first faces of the cases 420 of said active modules are very close to one another.

Such an arrangement of the active modules 410 on the plate 300 allows reducing their bulk on said plate, allowing increasing the number of rows of active modules 410 on the plate 300.

Such an active antenna is compact and advantageously enables, thanks to the apertures close to one another on the plate, a dense assembly of active modules, and therefore of SSPA amplifiers. In addition, the arrangement of the heat-transfer duct between the two rows of active modules allows for an effective thermal regulation of the active modules despite their compactness.

Heat-Transfer Duct 460

The assembly further comprises a heat-transfer duct 460 intended to evacuate heat originating from the active modules 410.

For example, the heat-transfer duct 460 is of the capillary heat pipe type.

For example, the heat-transfer duct 460 comprises, as illustrated in FIG. 7, at least one hollow elongated tube 461, and two support longitudinal panels 462, parallel to one another and arranged, opposite the at least one elongated tube 461, diagonally opposite. Preferably, the capillary heat pipe comprises two parallel elongated tubes 461 arranged between the two support longitudinal panels 462.

Advantageously, the heat-transfer duct 460 is arranged so as to be in contact with all of the active modules 410 of the first row and all of the modules of the second row of the assembly. Thus, in the illustrated example, the heat-transfer duct 460 is arranged so that one of the two support longitudinal panels 462 is in contact with all of the active modules 410 of the first row and the other support longitudinal panel 462 is in contact with all of the active modules 410 of the second row.

Preferably, the heat-transfer duct 460 juts out on either side of the first and second rows of active modules 410.

Preferably, to hold the heat-transfer duct 460 in place against the active modules 410 of the two rows and guarantee the thermal contact between the heat-transfer duct 460 and said active modules, a heat-conductive paste (not shown in the figures) is placed between the heat-transfer duct 460 and the active modules 410 of the two rows. Advantageously, the heat-conductive paste contributes to the passive thermal regulation of the active modules 410. The heat-conductive paste may be self-curing. According to one embodiment, the heat-conductive paste is a component of the MAPSIL® or Sigraflex® brand.

In a preferred embodiment, as illustrated in FIGS. 6 and 7, each active module 410 may have, over its entire width, a groove 430 for receiving a portion of the heat-transfer duct 460. Preferably, the groove 430 has a shape complementary, with some clearance, of a portion of the cross-section of the heat-transfer duct 460, preferably of half of the cross-section of the heat-transfer duct 460. Such a groove 430 is formed in the case 420 of the active modules 410, at the first face 421. Thus, when two active modules 410 of one assembly are positioned opposite the plate 300, these substantially surround the heat-transfer duct 460. Thus, the first faces of the cases 420 of said active modules 410 are very close, and even adjoined.

Such an arrangement of the active modules 410 on the plate 300 allows reducing their bulk on said plate 300, allowing increasing the number of rows of active modules 410 on the plate 300.

In one embodiment, as illustrated in FIGS. 1 to 3, the active portion 400 comprises a plurality of assemblies, the assemblies adjoining one another in parallel.

The plate 300 comprises a plurality of rows of apertures 310, the number of rows of apertures 310 corresponding at least to the number of rows of the assemblies. Two rows of apertures 310 of the plate 300 are spaced apart by a distance d enabling the insertion of two active modules 410 opposite one another, with some clearance.

The assemblies are arranged against one another such that the second face 422 of the cases 420 of the active modules 410 of the second row of one assembly is opposite the second face 422 of the cases 420 of the active modules 410 of the first row of active modules 410 of an adjoining assembly.

Preferably, the active modules 410 of the second row of one assembly and the active modules 410 of the first row of an adjoining assembly are immobilised with respect to one another. To enable such immobilisation, each active module 410 comprises third orifices 452 for receiving fastening elements, called fourth fastening elements 540. These fourth fastening elements 540 are intended to assemble together two active modules 410 opposite two adjoining assemblies. Said third orifices 452 pass through the thickness of the case 420 of the active module 410.

Preferably, the fourth fastening elements 540 are reversible fastening elements.

In a preferred embodiment, the fourth fastening elements 540 consist of clamping screws and the third orifices 452 of the active modules 410 are threaded, forming nuts for said clamping screws.

In a preferred embodiment, as illustrated in FIG. 7, an intermediate bar 600 may be interposed between the active modules 410 of the second row of an assembly and the active modules 410 of the first row of an adjoining assembly.

The intermediate bar 600 is sized so as to be held by friction between the active modules 410 of the second row of an assembly and the active modules 410 of the first row of an adjoining assembly, when said active modules are positioned on the plate 300.

On an active antenna with a large number of assemblies (double rows), if all rows were fastened together, mounting would then become too hyperstatic, defects would accumulate, thereby making mounting impossible. Nonetheless, fastening the assemblies together is still advantageous for a better resistance to lateral accelerations. Thus, the assemblies, with two rows each, could be fastened, for example, three-by-three, four-by-four or five-by-five. Thus, the assembly has a sufficiently high lateral resonance frequency, yet without preventing the mechanical mounting.

The active modules having, for example, identical external dimensions, an intermediate bar is added at the contact areas therebetween, whereas the active modules of one assembly with two rows to the other, are not in contact.

To improve the mechanical strength of the assemblies grouped in three, four or five, the intermediate bar may be made of a rough material of the Ekagrip® type (stainless steel inlaid with micro-diamonds). This increases the coefficient of friction between the assemblies and reduces the forces in the clamping screws.

In a preferred embodiment, the active portion 400 may comprise, at the end of the heat-transfer ducts, other heat-transfer ducts, called second heat-transfer ducts 500. All of the heat-transfer ducts 460 and the second heat-transfer ducts 500 form a thermal control system.

In a preferred configuration, illustrated in FIGS. 1 to 3, the active modules 410 of the assemblies are positioned on the plate 300 so as to have an overall pattern close to a circular, and preferably symmetrical, shape. Advantageously, such a pattern allows obtaining an improved radiofrequency performance.

Thus, the number of active modules per row of an assembly increasing from one edge B1 of the plate 300 up to the centre C2 of the plate 300 and then decreasing from said centre of the plate 300 towards an opposite edge B3, as illustrated in FIGS. 1 and 3. In the example of FIGS. 1 to 3, the active portion 400 comprises 14 assemblies, namely 28 rows of active patterns. 132 modules are distributed over these 28 rows. Each active module 410 comprises 4 SSPA amplifiers, namely a total of 528 SSPA amplifiers.

For example, a typical density for the plate is 5,000 to 8,000 apertures/$m^2$.

Thus, the active antenna according to the invention advantageously enables the assembly of a high density of SSPA amplifiers.

Mechanical vibration tests have been carried out and have proved to comply with modal and quasi-static specifications. Thus, the active antenna according to the invention is perfectly suitable for installation in a spacecraft, and able in particular to withstand the vibration loads inherent in the launch phase.

Mounting Method:

An example of a method for mounting the constituent elements of the active portion 400 on the plate 300 is now described.

Because of the large number of active modules and their dense pattern on the plate 300, the assembly of the active modules can be carried out only sidewards.

The method is described in the case of assembly of a first assembly and then of a second assembly, adjoining the first assembly, as illustrated in FIGS. 1 and 2. Without limitation, each row of the first assembly and of the second assembly comprises two active modules 410.

In the described example, each active module 410 comprises an indentation 429 and a groove 430.

Preferably, the passive portion 200 of the active antenna is assembled to the plate 300 beforehand, for example by screwing.

The first assembly is assembled to the plate 300. The first assembly is arranged the closest to an edge of the plate 300.

In a first step, as illustrated in FIG. 8 *a*), the beam 450 of the first assembly is assembled to the plate 300.

The beam 450 is positioned on the plate 300 such that its alignment elements cooperate with complementary alignment elements 330 of the plate 300, thereby guaranteeing the proper positioning of the beam 450 on the plate 300. Thus, the first orifices 451 of the beam 450 coincide with first orifices 340 of the plate 300.

Then, the beam 450 is fastened to the plate 300 thanks to the first fastening elements 510.

In the case where the first fastening elements 510 consist of clamping screws, said clamping screws are screwed into the first threaded orifices 451 of the beam 450 and then the first threaded orifices 340 of the plate 300, thereby causing immobilisation of the beam 450 on the plate 300.

In a second step, as illustrated in FIGS. 8 *b*) and *c*), the active modules 410 of the first row are assembled to the beam 450.

In a first sub-step, a first active module 410 is positioned on the plate 300 such that its alignment members 432 cooperate with complementary alignment members 320 of the plate 300, thereby guaranteeing the proper positioning of the first active module 410 on the plate 300. Thus, the RF output interfaces 427 of the first active module 410 coincide with apertures 310 of a first row of apertures of the plate 300. The seals of the first active module 410 surround said apertures of the plate 300. The indentation 429 of the first active module 410 cooperates with the beam 450.

In a second sub-step, a second active module 410, adjacent to the first active module 410, is positioned on the plate 300. The second active module 410 is positioned on the plate 300 such that its alignment members 432 cooperate with complementary alignment members 320 of the plate 300. The second active module 410 adjoins the first active module 410, at one of their longitudinal edges 423. Thus, the RF output interfaces 427 of the second active module 410 coincide with other apertures 310 of the first row of apertures of the plate 300. The seals of the second active module 410 surround said apertures of the plate 300. The indentation 429 of the second active module 410 cooperates with the beam 450.

In a third sub-step, the active modules 410 are fastened to the beam 450.

A nominal pressure is first applied on the first active module 410 to compress the seals of the first active module 410. This nominal pressure is applied from the second lateral edge 426 and in the direction of the plate 300. Preferably, the exerted nominal pressure is in the range of 150 N.

When the seals of said first active module 410 are compressed, the first active module 410 is fastened to the beam 450 thanks to the second fastening elements 520.

In the case where the second fastening elements 520 consist of clamping screws, each clamping screw passes through the beam 450 and then the first active module 410. Thus, each screw is screwed first into the second threaded orifices 452 of the beam 450 and then into the second threaded orifices 434 of the first active module 410, thereby causing immobilisation of the beam 450 on the plate 300.

When said second fixing elements 520 are in place, the nominal pressure on the first active module 410 is relieved. The seals of the first active module 410 are then properly positioned around the respective apertures 310 of the plate 300.

Afterwards, a nominal pressure is applied on the second active module 410 to compress the seals of the second active module 410, in a manner similar to that applied on the first active module 410. Then, the second active module 410 is fastened to the beam 450 thanks to the second fastening elements 520, like for the first active module 410.

In the example of FIG. 8.*b*, two clamping screws allow fixedly assembling each active module 410 of the first row to the beam 450.

In this example of implementation of this second step, the active modules 410 are positioned after one another and then pressed and assembled to the beam 450 after one another.

It is also possible to consider at first positioning, pressing and fixedly assembling the first active module 410 to the beam 450 and then positioning, pressing and fixedly assembling the second active module 410 to the beam 450.

It is also possible to consider at first positioning all of the active modules 410 and then pressing them simultaneously and fixedly assembling them to the beam 450.

Upon completion of this second step, all of the active modules 410 of the first row are fastened to the beam 450.

In a third step, as illustrated in FIG. 8 *d*), the heat-transfer duct 460 is assembled to the active modules 410 of the first row.

The heat-conductive paste is deposited over a portion of the heat-transfer duct 460.

In the example of the heat-transfer duct 460 formed by at least one elongated tube 461 and two support longitudinal panels 462, the heat-conductive paste is deposited over each of the support longitudinal panels 462. Then, the heat-transfer duct 460 is positioned against the active modules 410 of the first row.

The heat-transfer duct 460 is placed so that one of the support longitudinal panels 462 over which the heat-conductive paste is deposited is placed against the first face 421 of the cases 420 of the active modules 410 of the first row, with the paste between the support longitudinal panel 462 and the first face 421 of the cases 420 of the modules of the first row. The heat-transfer duct 460 is inserted in particular into the groove 430 provided in the first face 421 of the cases 420 of the active modules 410. This step should be performed as long as the paste is not completely cured.

When the paste starts curing, it forms a paste layer which adheres both to the support longitudinal panel 462 of the heat-transfer duct 460 and to the active modules 410 of the first row so that the heat-transfer duct 460 and the modules are secured together. Advantageously, the paste layer compensates for the differences in thickness between the first face 421 of the cases 420 of the active modules 410 and the support longitudinal panel 462. Thus, it is possible to guarantee that the heat-conductive paste fills any interstices between the longitudinal support panel 462 of the heat-transfer duct 460 and the active modules 410 of the first row.

In a fourth step, as illustrated in FIGS. 8 *d*) and *e*), the active modules 410 of the second row of the first assembly are assembled to the active modules 410 of the first row. The bevelled profile, on the one hand, of the active module and, on the other hand, of the beam allows, by inclining the active module of the second row of the first assembly, inserting it between the active module of the first row already in place and the beam.

In a first sub-step, a first active module 410 of the second row is positioned on the plate 300 such that its alignment members 432 cooperate with complementary alignment members 320 of the plate 300, thereby guaranteeing a proper positioning of the first active module 410 on the plate 300. The first active module 410 of the second row is positioned so that the first face 421 of its case 420 is opposite the first face 421 of the case 420 of the first module of the first row. Thus, the RF output interfaces 427 of the first active module 410 of the second row coincide with apertures 310 of a second row of apertures of the plate 300. The seals of the first active module 410 of the second row surround said apertures of the plate 300. The indentation 429 of the case 420 of the first active module 410 of the second row cooperates with the beam 450. The groove 430 of the case 420 of the first active module 410 of the second row cooperates with the heat-transfer duct 460, with the heat-conductive paste between the other longitudinal support panel 462 of the heat-transfer duct 460 and said groove 430.

In a second sub-step, the first active module 410 of the second row is fastened to the first active module 410 of the first row.

A nominal pressure is first applied on the first active module 410 of the second row to compress the seals of said first active module 410. This nominal pressure is applied from the second lateral edge 426 and in the direction of the plate 300. Preferably, the exerted nominal pressure is in the range of 150 N.

When the seals of said first active module 410 of the second row are compressed, said first active module 410 of the second row is fastened to the first active module 410 of the first row thanks to the first elements fastening means 510.

In the case where the first fastening elements 510 consist of clamping screws, said clamping screws are screwed at first into the first threaded orifices 433 of the first active module 410 of the second row and then into the first threaded orifices 433 of the first active module 410 of the first row, thereby causing immobilisation of the first active module 410 of the second row with the first active module 410 of the first row.

When said first fastening elements 510 are in place, the nominal pressure on the first active module 410 of the second row is relieved. The seals of the first active module 410 are then properly positioned around the respective apertures 310 of the plate 300. In the example of FIG. 8 *d*), four clamping screws allow fixedly assembling the first active module 410 of the second row to the first active module 410 of the first row, two clamping screws on either side of the heat-transfer duct 460.

In a third sub-step, a second active module 410 of the second row, adjacent to the first active module 410, is positioned on the plate 300. Said second active module 410 is positioned on the plate 300 such that its alignment members 432 cooperate with complementary alignment members 320 of the plate 300. The second active module 410 adjoins the first active module 410, at one of their longitudinal edges 423. The second active module 410 of the second row is then positioned such that the first face 421 of its case 420 is opposite the first face 421 of the case 420 of the second module of the first row. Thus, the RF output interfaces 427 of the second active module 410 coincide with other apertures 310 in the second row of apertures of the plate 300. The seals of the second active module 410 of the second row surround said apertures of the plate 300. The indentation 429 of the second active module 410 cooperates with the beam 450. The groove 430 of the case 420 of the first active module 410 of the second row cooperates with the heat-transfer duct 460, with the heat-conductive paste between the other longitudinal support panel 462 of the heat-transfer duct 460 and said groove 430.

Then, the second active module 410 of the second row is fastened to the second active module 410 of the first row, in a similar manner to fastening of the first active module 410 of the second row with the first active module 410 of the first row (cf. hereinabove, the second sub-step of the fourth step).

In this example of implementation of this fourth step, the active modules 410 of the second row are positioned, pressed and assembled after one another.

It is also possible to consider at first positioning all of the active modules 410 of the second row and then pressing them simultaneously, or after one another, and assembling them to the opposite active modules, belonging to the first row.

Upon completion of this fourth step, the first assembly of the active portion 400 is assembled to the plate 300.

The beam 450 is fixedly assembled to the plate 300. Each active module 410 of the first row is fixedly assembled to the beam 450. The active modules 410 of the first row are not fixedly assembled together. The active modules 410 of the second row are not fixedly assembled to the beam 450 but only to the active modules 410 of the first row located opposite them. The active modules 410 of the second row are not fixedly assembled together.

Afterwards, the second assembly of the active portion 400 can be assembled to the plate 300. The second assembly is arranged parallel to the first assembly, adjoining the latter.

In a fifth step, the beam 450 of the second assembly is assembled to the plate 300.

The beam 450 of the second assembly is fastened parallel to the beam 450 of the first assembly.

The beam 450 of the second assembly is assembled in a similar manner to the beam 450 of the first assembly (cf. the first step).

In a sixth step, as illustrated in FIGS. 9 *a*) to *c*), the active modules 410 of the first row of the second assembly are assembled to the beam 450 of the second assembly. The active modules 410 of the first row of the second assembly are assembled to the beam 450 of the second assembly in a similar manner to the assembly of the active modules 410 of the first row of the first assembly on the beam 450 of the first assembly (cf. the second step).

Thus, the RF output interfaces 427 of the active modules 410 of the second assembly coincide with apertures 310 of a third row of apertures of the plate 300.

In the case where the beam 450 has a trapezoidal cross-section, the first active modules 410 of the first row of the second assembly are inserted between the active modules 410 of the second row of the first assembly and the beam 450 of the second assembly by inclining said first active modules of the first row of the second assembly to insert their first lateral edge 425 at first, and then by setting said active modules of the first row of the second assembly perpendicular to the plate 300.

In an optional next step, it is possible to slip the intermediate bar between the second row of active modules of the first assembly and the first row of active modules of the second assembly so as to fasten afterwards, for example by the screws 540, the active modules of two successive assemblies.

In a seventh step, as illustrated in FIG. 9 *d*), the heat-transfer duct 460 of the second assembly is assembled to the active modules 410 of the first row of the second assembly. This seventh step is similar to the third step.

In an eighth step, as illustrated in FIGS. 9 *d*) and *e*), the active modules 410 of the second row of the second assembly are assembled to the active modules 410 of the first row of the first assembly. This eighth step is similar to the fourth step.

Thus, the RF output interfaces 427 of the active modules 410 of the second assembly coincide with apertures 310 of a fourth row of apertures of the plate 300.

Upon completion of this eighth step, the second assembly of the active portion 400 is assembled to the plate 300. The beam 450 is fixedly assembled to the plate 300. Each active module 410 of the first row is fixedly assembled to the beam 450. The active modules 410 of the first row are not fixedly assembled together. The active modules 410 of the second row are not fixedly assembled to the beam 450 but only to the active modules 410 of the first row located opposite them. The active modules 410 of the second row are not fixedly assembled together.

The active modules 410 of the first row of the second assembly are fixedly assembled with the active modules 410 of the second row of the first assembly.

As indicated before in the optional step carried out before the seventh step, the method may comprise a step of positioning an intermediate bar 600 between the active modules 410 of the second row of the first assembly and the active modules 410 of the first row of the second assembly.

This step may be carried out after positioning the active modules 410 of the first row of the second assembly but before fastening said active modules 410 of the first row of the second assembly to the active modules 410 of the second row of the first assembly.

The intermediate bar 600 is interposed between the active modules 410 of the second row of the first assembly and the active modules 410 of the first row of the second assembly and is held by friction between the second faces of the cases 420 of the different active modules 410, connected together by screwing.

The previously-described mounting method applies to the assembly of several assemblies, the assemblies could comprise different numbers of active modules.

The description hereinbefore clearly illustrates that, thanks to its different features and their advantages, the present invention achieves the objectives that it has set. In particular, the invention provides a compact active antenna, with a reduced spacing between the active modules, therefore with a high density of SSPA amplifiers, capable of withstanding great vibration loads and enabling the set-up of a heat pipe in contact with each of the modules.

The invention claimed is:

1. An active antenna, comprising:
- a passive portion of an antenna array extended at one end by a plate in which apertures are formed,
- at least one active assembly for transmitting radiofrequency RF waves, called assembly, through said apertures, each assembly comprising:
  - a first row of active modules facing apertures of the plate,
  - a second row of active modules facing apertures of the plate and attached to the first row of active modules,
  - a beam attached to the plate and held clamped between the first row of active modules and the second row of active modules,
  - a heat-transfer duct in contact with the first row of active modules and the second row of active modules and jutting out on either side of said first and second rows of active modules, wherein the beam of an assembly has a bevelled profile cooperating with profiles of the first and second rows of active modules of said assembly to press them against the plate.

2. The active antenna according to claim 1, comprising a plurality of assemblies arranged against one another, wherein the second row of active modules of one assembly is attached to the first row of active modules of an adjoining assembly.

3. The active antenna according to claim 2, wherein intermediate bars are arranged between second rows of active modules of one of the assemblies and first rows of active modules of an adjoining assembly, so as to form groups of several assemblies secured to one another.

4. The active antenna according to claim 2, wherein the number of active modules per row of one assembly is increasing from one edge of the plate up to a centre of the plate and then decreasing from said centre of the plate towards an opposite edge.

5. A method for mounting the active antenna according to claim 1, comprising a step of assembling an assembly, so-called first assembly, on the plate, said step comprising:
- assembling the beam of the first assembly to the plate,
- assembling the first row of active modules of the first assembly to said beam,
- assembling the heat-transfer duct of the first assembly to said first row of active modules,
- assembling the second row of active modules of the first assembly to said first row of active modules.

6. The method for mounting the active antenna according to claim 5, comprising setting at a determined pressure of each active module against the plate, then relieving after assembly of each active module to the beam or to an opposite active module.

7. The method according to claim 5, comprising a step of assembling another assembly, so-called second assembly, adjoining the first assembly, said step comprising:

assembling the beam of the second assembly to the plate, assembling the first row of active modules of the second assembly to said beam and to the second row of active modules of the first assembly, assembling the heat-transfer duct of the second assembly to said first row of active modules of the second assembly, assembling the second row of active modules of the second assembly to the first row of active modules of the second assembly.

8. The method according to claim 7, comprising tilting the first row of active modules of the second assembly upon insertion of said active modules between the second row of active modules of the first assembly already in place and the beam.

* * * * *